(12) United States Patent
Balinsky et al.

(10) Patent No.: US 11,356,268 B2
(45) Date of Patent: Jun. 7, 2022

(54) DIGITAL COMPOSITION HASHING

(71) Applicant: Hewlett-Packard Development Company, L.P., Spring, TX (US)

(72) Inventors: Helen Balinsky, Bristol (GB); Scott White, Boise, ID (US); Robert Taylor, Vancouver, WA (US); Adrian Baldwin, Bristol (GB); Jonathan Griffin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 224 days.

(21) Appl. No.: 16/613,821

(22) PCT Filed: Jun. 2, 2017

(86) PCT No.: PCT/US2017/035623
§ 371 (c)(1),
(2) Date: Nov. 15, 2019

(87) PCT Pub. No.: WO2018/222202
PCT Pub. Date: Dec. 6, 2018

(65) Prior Publication Data
US 2020/0186354 A1 Jun. 11, 2020

(51) Int. Cl.
*H04L 29/06* (2006.01)
*H04L 9/32* (2006.01)
*G06K 15/00* (2006.01)

(52) U.S. Cl.
CPC ........ *H04L 9/3236* (2013.01); *G06K 15/4095* (2013.01); *H04L 9/3247* (2013.01); *H04L 9/3297* (2013.01); *H04L 2209/38* (2013.01)

(58) Field of Classification Search
CPC ... H04L 9/3236; H04L 9/3247; H04L 9/3297; H04L 2209/38; H04L 2209/84; G06K 15/4095; G06F 21/64
See application file for complete search history.

(56) References Cited

U.S. PATENT DOCUMENTS

| 10,201,939 B1* | 2/2019 | Pare | B29C 64/386 |
| 10,235,538 B2* | 3/2019 | Uhr | G06Q 20/02 |
| 2002/0194484 A1* | 12/2002 | Bolosky | G06F 21/64 713/189 |

(Continued)

OTHER PUBLICATIONS

Thymian, M. "Evaluating IP Infringement Risks for Designers and Consumers of 3d Printing Services", TechCrunch, Posted Nov. 15, 2016, Available at: https://techcrunch.com/2016/11/15/evaluating-ip-infringement-risks-for-designers-and-consumers-of-3d-printing-services/.

*Primary Examiner* — Shawnchoy Rahman
*Assistant Examiner* — Lin Chang
(74) *Attorney, Agent, or Firm* — HP Inc. Patent Department

(57) ABSTRACT

Examples associated with digital composition hashing are described. One example method includes receiving a digital composition file from a user. The digital composition file may include a top-level design and a hierarchy of sub-level designs. A hashed structure may be generated from the digital composition file, where a node in the hashed structure for the first sub-level design is generated based on hashes of sub-level designs below the first sub-level design in the hierarchy. The hashed structure and a hash of the digital composition file are stored in association with the user.

15 Claims, 6 Drawing Sheets

(56) References Cited

U.S. PATENT DOCUMENTS

| | | | |
|---|---|---|---|
| 2003/0217275 A1* | 11/2003 | Bentley | G06F 21/64 |
| | | | 713/184 |
| 2006/0268347 A1 | 11/2006 | Lapstun et al. | |
| 2008/0186544 A1 | 8/2008 | Lapstun et al. | |
| 2009/0019548 A1 | 1/2009 | Reid | |
| 2009/0254530 A1* | 10/2009 | Jaffe | G06F 21/64 |
| 2011/0286624 A1* | 11/2011 | Choi | G06K 9/00 |
| | | | 345/420 |
| 2014/0058959 A1 | 2/2014 | Isbjornssund et al. | |
| 2014/0156053 A1* | 6/2014 | Mahdavi | B29C 64/112 |
| | | | 700/119 |
| 2014/0283104 A1 | 9/2014 | Nilsson | |
| 2014/0289523 A1* | 9/2014 | Serret-Avila | H04L 63/0428 |
| | | | 713/168 |
| 2015/0298483 A1 | 10/2015 | Peng et al. | |
| 2016/0212146 A1 | 7/2016 | Wilson | |
| 2016/0259306 A1 | 9/2016 | Pangrazio et al. | |
| 2016/0283920 A1* | 9/2016 | Fisher | G06Q 20/065 |
| 2016/0292396 A1* | 10/2016 | Akerwall | G06F 21/10 |
| 2016/0328773 A1 | 11/2016 | Hassett et al. | |
| 2017/0279783 A1* | 9/2017 | Milazzo | H04L 9/14 |
| 2018/0026791 A1* | 1/2018 | Bohli | G06F 21/602 |
| | | | 713/154 |

* cited by examiner

DIGITAL COMPOSITION HASHING

BACKGROUND

Over time, the world has steadily increased storing, distributing, and even producing digital content. This content has steadily expanded from text, images, and so forth, to entire editable designs and plans. These designs are now even used to generate objects in the real world. For example, the designs may control complex manufacturing processes, and more recently 3D printers to produce physical objects. In some cases, not only are the top-level designs valuable, but so too are sub-elements and combinations of the sub-elements.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with digital composition hashing are described. As the world moves further into the digital age, in which designs of objects are increasingly being used to produce the objects on an individual basis (e.g., using 3D printers), it is becoming desirable to be able to prove originality of a design. This may allow a user to prevent copying the design, and in some cases may allow the user to avoid being prevented from using their own design by proving that the user authored the design. Further, because of the manipulability of design files, it may be desirable to prove originality of features and/or sub-components of the design files without revealing the entire design and/or other sub-components.

Consequently, techniques disclosed herein may allow a user to submit a marked up design to produce a time stamped authenticating record that will allow the user to establish a date of authorship of the design, one or more features of the design, and also combinations of features. This is achieved by creating a hashed structure from a composition file that identifies sub-features and combinations of sub-features of a design that an author believes to be valuable. The hashed structure may then be stored, and if desired, used in the future to authenticate authorship of a design file, its individual features, and combinations of features. Further, when individual features and/or combinations of features are authenticated, they may be authenticated without revealing other components of the original design by virtue of the hashed structure.

Figure 1:
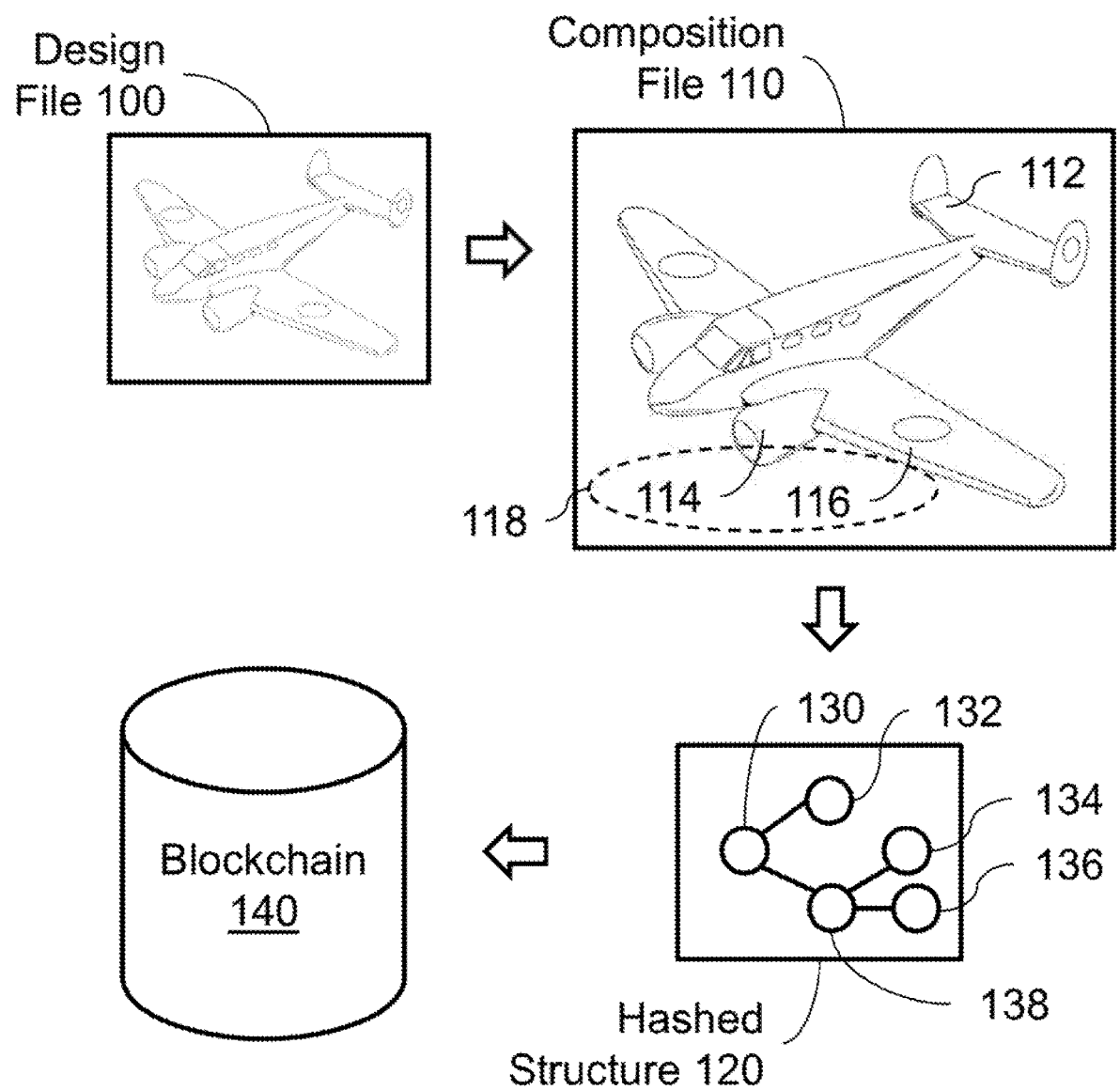
FIG. 1 illustrates example files and data structures associated with digital composition hashing.

FIG. 1 illustrates example files and data structures associated with digital composition hashing. It should be appreciated that the items depicted in FIG. 1 are illustrative examples, and many different systems, devices, and so forth, may operate in accordance with various examples.

FIG. 1 illustrates example files and data structures associated with digital composition hashing on which example systems and methods may operate. For example, FIG. 1 includes a design file 100. In this example, design file 100 relates to a model airplane, though in other examples, the design file could relate to numerous objects, structures, and so forth. As used herein, a design file may refer broadly to many types of files or formats which can be used to aid in production, creation, and so forth of an object depicted in the design file. Design files may be generated, for example, by a user with the assistance of variety of computer aided design techniques and/or applications, a scan of a physical object using a 3D scanner, photogrammetric techniques, and so forth. In various examples, features of the design file may be specifically identifiable and/or modifiable within the design file.

Eventually, a user may seek to be able to prove authorship of the design file and/or one or more features from the design file, without having to reveal the entire design and/or all of its features. To achieve this, the user, may first use, for example, a markup tool to specify features of design file 100 that the user seeks to protect. Generally, marking up design file 100 for protection may be based on features of design file 100 that are believed to be valuable by a user, though in other examples, certain tools may aid the user in identifying features, and/or describing them in the markup. Broadly, protected features may relate to, for example, parts, fragments, elements, combinations of the above, and so forth that the user believes are unique to the design file. In general, the features may achieve goals relating to, for example, structure, function, aesthetics, and so forth, and may include features describing colors, materials, textures, shapes, descriptions of features, and so forth. In some examples, fragments, properties and/or attributes of the entire design itself may also be treated as features.

Eventually, a process may use this markup information in combination with design file 100 to create a composition file 110. Generally, a composition file 110 may include one top-level design, and several sub-level designs and combinations of sub-level designs. Composition file 110 may be an annotated version of design file 100, have an independent file format, and so forth. This example highlights 3 sub-level designs (tail 112, engine 114, and wing 116) and one sub-level design combination (engine-wing 118). How composition file 110 describes the top-level design, the various sub-level designs and their combinations may be achieved in a variety of ways. For example, composition file 110 may use design file 100 itself as the top-level design, and data specific to the sub-level designs to describe the to be protected features. By way of illustration, a computer-aided design application may describe the engine in design file 100 as information describing a set of relative or absolute pixels, voxels, lines, volumes, and so forth. This information may then be incorporated into or used to generate engine sub-level design 114 by a process building composition file 110.

In some examples, the markup tool may also facilitate adding, metadata to composition file 110. This metadata may either be automatically generated during the generation of composition file 110 based on design file 100, or generated based on information provided by a user marking up the design file. Individual sub-components may have several pieces of metadata which may be either public or private. Public metadata may be data that the user marking up design file 100 seeks to have publically viewable, while private metadata may be later stored in a manner that cannot be accessed without permission and/or assistance from the user. Public data for a feature may include high level descriptions of components. For example, "engine" may serve as public metadata for engine 114. Private metadata may describe, for example, what the user considers to be within the scope of the stored design.

Once composition file 110 has been created, the user may transmit composition file 110 to a notary service that will store information that can be used to authenticate authorship of design file 100 and its sub-level designs. First, the notary service may validate composition file 100 to ensure that the structure is valid and that its components are included. Validation of composition file 110 may ensure that the composition file 110 was is properly formatted and that, for example, if composition file 110 specifies existence of an engine sub-design 114 then composition file 110 actually includes data describing engine sub-design 114.

Once composition file 110 has been verified, the notary service may produce a hashed structure 120 from composition file 110. Hashed structure 120 may be, for example, a Merkle hash tree, a hash chain, or other hashed structure. Hashed structure 120 may be a tree where leaf nodes are generated by hashing data of sub-level designs (e.g., engine sub design 114). The leaf nodes may also include metadata when appropriate, and may also be alternatively generated using encrypted versions of sub-level designs when the user desires. Interior nodes of the tree may be generated by hashing the data of sub-level designs together, and may also include their own metadata or interior data if such data is available. Consequently, a root 130 of hashed structure 120 may be generated based on hashing together the data from nodes 132 and 138. In turn, 138 may be generated using a similar process on nodes 134 and 136 and node 132 may be generated by hashing the data describing tail 112 from composition file 110 with metadata found therein. When the data describing tail 112 is in an encrypted state in composition file 110, the encrypted version of this data may be used. To use hashed structure 120 to authenticate origination of a sub-level design, data from composition file 110 may be stored so this data may be used to recreate hashed structure 120. To prove a sub-level design (e.g., engine 114) was originally a part of the design file 100, from hashed structure 120, nodes 136, 138, 132, along with information used to create node 134 (e.g., data describing engine 114, metadata) may be used to recreate root node 130. If these match, then the sub-level design may be authenticated to a time that is stored in associated with the hash of root 130.

In various examples, hashed structure 120 may be binary or non-binary, and multiple internal nodes may point to the same leaf as some design elements may be included in multiple distinct sub-level design combinations of design elements. In one example, a leaf node of hashed structure 120 may be generated from composition file 110 itself and combined into hashed structure 120. In other examples, data from composition file 110 not in singled out as a sub-level design may be formed into its own leaf node that descends from the root node 130. Other nodes of hashed structure 110 may each relate to either a specific sub-level design of composition file 110, or to a combination of sub-level designs from composition file 110. For example, nodes 132, 134, and 136 correspond respectively to the tail 112, engine 114, and wing 116 sub-designs of composition file 110. Node 138 corresponds to the engine-wing sub-design combination 118.

By way of illustration, consider a scenario where hashed structure 120 is a Merkle hash tree. In a Merkle tree, non-leaf nodes are labeled with hashes of their children nodes, and leaf nodes may include data. This may make it possible to prove, when a node is a member of hashed structure 120. Consequently, node 130 may be labeled with hashes of nodes 132 and 138, and node 138 may be labeled with hashes of nodes 134 and 136. Leaf nodes may be generated from their respective components from composition file 110. In various examples, leaf nodes may include actual data from composition file 110 and/or design file 100, hashes of the data retrieved from composition file 110 and/or design file 100, and so forth.

For example, data stored in leaf nodes generated for sub-level designs may take the form [<sub-level design, metadata>, public metadata], where various operations have been performed on the <sub-level design, metadata> portions. These operations may include, for example, encryption, hashing, watermarking, and so forth. Sub-level design combinations may be stored in the form [<hash(sub-level design I, metadata i), public metadata i, . . . , hash(sub-level design j, metadata j), public metadata j, metadata>, public metadata]. Generation of sub-level designs may be performed up the tree until the root node 130 is created.

Once hashed structure 120 has been created, hashed structure 120 may be stored by the notary service. In one example, hashed structure 120 may be stored in a blockchain 140. However, it may be sufficient to store a root 130 of hashed structure 120 in blockchain 140, and the remaining information may be stored in another location (e.g. a database belonging to the notary service). A blockchain may be a distributed database that maintains a growing list of ordered records. Blocks generally contain a timestamp and a link to a previous block making it difficult to edit a block once it has been added to the blockchain. When blockchains are used, the act of registering hashed structure 120 may be recorded as a transaction in the blockchain. In other examples, individual portions of hashed structure 120 may be included in blockchain transactions. In either case, transactions involving hashed structure 120 may be merged with transactions relating to other hashed structures when inserting these transactions into the blockchain. In other examples hashed structure 120 may be stored in a database. In these examples, the hashed structure may be stored in association with a secure time stamp to prevent the date at which the hashed structure was added to the database from being subsequently modified. The secure time stamp may be generated based on the root 130 of hashed structure 120. A secure time stamp may be a signing by a time stamp authority of a particular piece of data. For example, a secure time stamp may be generated based on the root 130 of hashed structure 120, the time, and the identity of the time stamp authority.

Storing hashed structure 120 in association with a user may be performed using a variety of techniques and may depend on the technique in which hashed structure 120 is stored (e.g., block chain 140, database). In some cases it may be desirable to sign hashed structure 120 using a digital signature associated with the user. Employing a digital signature in this manner may make it more difficult for a malicious entity to claim authorship of composition file 110 when hashed structure is digitally signed using a signature unique to the user. In other examples, storing hashed structure 120 in association with a user may include storing hashed structure 120 in association with a user identifier in a database, including data identifying the user, and so forth.

In the future, in the event a user is in dispute regarding the creation of a design, the user may retrieve the data stored in the blockchain or from the data store via the notary service. This data may, on its own or in combination with records of the user may prove that the user submitted the composition file 110 at the time indicated in the blockchain or secure time stamp. By way of illustration, to help resolve a dispute, the notary service may provide the user the hashed structure and/or a hash of composition file 110 which the user can compare to a newly generated hashed structure or newly generated hash of composition file 110. If there is a match, this may prove a date of authorship of design file 100 as indicated in association with the stored hashed structure. Similarly, if the user seeks to only prove authorship of a sub-level design, the user may be provided with a package including information regarding the sub-level design of interest, a hash composition file 110 to prove the sub-level design is included, and submission date information. Depending on how hashed structure 120 is stored and what information is included in hashed structure 120 may facilitate providing different forms of information to facilitate resolving disputes.

At various points it may also be desirable to encrypt sub-level designs. First, in some cases, the user may seek to encrypt portions of composition file 110 prior to transmitting it to the notary service for storage. In these cases, the individual sub-level designs of composition file 110 may be encrypted separately so that they can also be separately retrieved. When the sub-level designs are encrypted by the user, the user may be responsible for maintaining encryption keys for future decryption of the sub-level designs so that the user can authenticate authorship of the sub-level designs.

In other examples, the notary service may perform encryption of the sub-level designs. This may involve creating a new version of composition file 110 that replaces sub-level designs with encrypted versions of the sub-level designs. This may be achieved using, for example, a key derivation function from a single key, a newly generated key for each sub-level design, and so forth. In cases where the notary service performs the encryption, the notary service may maintain the keys. Whether encryption is performed by the user or the notary service, nodes in hashed structure 120 may be generated based on the encrypted versions of the sub-level designs. Other agreed upon encryption techniques may also be employed. For example, a key may be shared between the notary service and the user which may ensure that cooperation of both parties are needed to decrypt encrypted portions of hashed structure 120.

Once data has been stored in blockchain 140 or in a data store, the notary service may provide confirmation data to the original user. The confirmation information may be used by the user both to ensure that the storage process completed properly, and to retrieve the information in the future. In some examples, the confirmation data may include a hash of the composition file. The hash of the composition file may be compared by the user to a hash of the composition file calculated by the user. If there is a mismatch, this may indicate corruption of the composition file during transmission of the composition file to the notary service. In other examples, the confirmation may also include, the secure time stamp, a position in a block chain, and so forth. The confirmation information may also include, for example, a hash of composition file 110, other information stored in the blockchain, a signature of the notary service, and so forth.

As used herein, the term is intended to broadly refer to an entity that provides a composition file to a notary service to facilitate authenticating components of a design file from which the composition file was generated. In some examples, a user may refer to an individual that created the design file. In other examples, a user may refer to a company or group of individuals that have some interest in the design file. In these examples, when a user is said to take some action, the action may be taken by an individual representing or acting on behalf of the company or group.

Examples discussed above describe a notary service performing certain actions associated with generating a hashed structure for storage in a data store, blockchain, and so forth. In other examples, several of these actions may be performed by a user running an application on their own device. This application may be, for example, a public domain tool, a tool provided by the notary service, a tool that conforms to a standard dictated by the notary service, and so forth. Thus, in some examples, the user may effectively create the hashed structure themselves and store the hashed structure by providing the hashed structure to the notary service. This may allow the user to protect a design without having to provide the design or an accessible version to another entity (e.g., the notary service). In the event of a dispute involving the design in this example, a time stamp associated with the hashed structure provided by the user and stored in a data store and/or block chain by the notary, in combination with data provided by the user, may serve to authenticate origination of the design.

It is appreciated that, throughout this description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
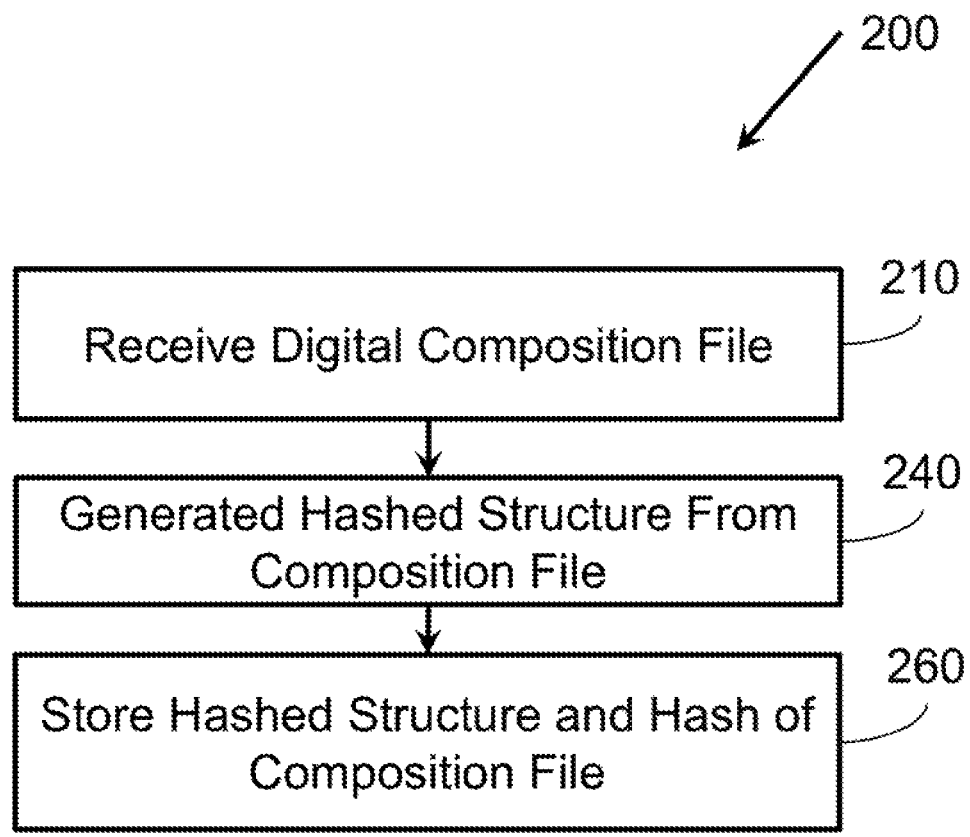
FIG. 2 illustrates a flowchart of example operations associated with digital composition hashing.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

FIG. 2 illustrates a method 200 associated with digital composition hashing. Method 200 includes receiving a digital composition file at 210. The digital composition file may describe features, components, combinations of features and/or components, and so forth of a digitally represented object(s) for which the user seeks to authenticate authorship. The digital composition file may be received from a user. The user may be, for example, a person, a group of collaborators, a company, and so forth. The digital composition file may comprise a top-level design and a hierarchy of sub-level designs.

Method 200 also includes generating a hashed structure at 240. The hashed structure may be generated from the digital composition file. A node in the hashed structure for a first sub-level design may be generated based on hashes of the sub-level designs below the first sub-level design in the hierarchy. In some examples, one or more of the sub-level designs may be received in an encrypted state. In these examples, method 200 may include decrypting these encrypted sub-level designs (not shown). This may facilitate generating the hashed structure based on the sub-level designs themselves when appropriate.

In some examples, the sub-level designs may be described by metadata. This metadata may be incorporated into the hashed structure. In some examples, the metadata may include both private metadata and public metadata. When there is private metadata, the private metadata may be incorporated into the hashed structure in an encrypted state using the keys used to encrypt sub-designs with which respective private metadata is associated. Public metadata may be readable by a user with access to the hashed structure.

Method 200 also includes storing the hashed structure and a hash of the digital composition file at 260. The hashed structure and the hash of the digital composition file may be stored in association with the user. In some examples, the hashed structure and the hash of the digital composition file are stored using a blockchain. In other examples, the root of the hashed structure, and the user who submitted the hashed structure may be stored in the blockchain, and the hashed structure and other data related to the hashed structure (e.g., the digital composition file, a design from which the digital composition file was generated) may be stored elsewhere. In this example, the root may be sufficient to establish a date at which the composition file was submitted. When the hashed structure is stored in the block chain, sub-level designs may be enveloped into individual transactions that are signed by a user's private keys. These individual transactions may be combined together into a block that is incorporated into the blockchain by a notary service.

In various examples actions associated with method 200 may be performed by a user, a notary service, and so forth. When a user is considered to be performing the actions of method 200, the user may be executing an application on a device to perform receiving action 210 (effectively receiving the digital composition file as an input) and generating action 240. The user and/or application may perform storing action 260 by providing the hashed structure and the hash of the digital composition file to, for example, a notary service, storing them in a blockchain themselves, and so forth. When a notary performs actions associated with method 200, the notary service may receive the digital composition file from the user, and perform the other actions using devices controlled by the notary service.

Figure 3:
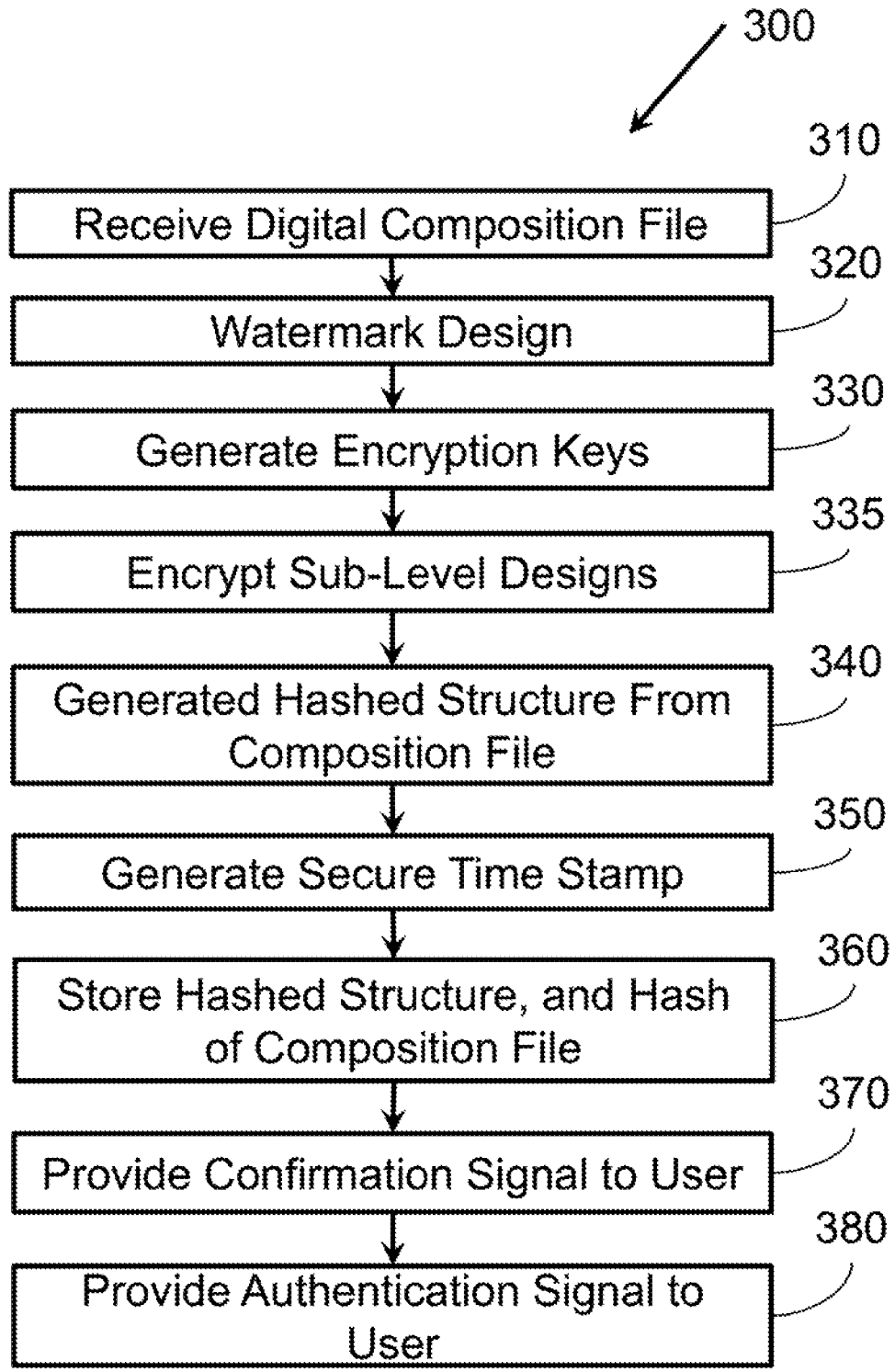
FIG. 3 illustrates another flowchart of example operations associated with digital composition hashing.

FIG. 3 illustrates another method 300 associated with digital composition hashing. Method 300 includes several actions similar to those described above with reference to method 200 (FIG. 2). For example, method 300 includes receiving a digital composition file comprising a top-level design and sub-level designs from a user at 310, generating a hashed structure from the composition file at 340, and storing the hashed structure at 360.

Method 300 also includes watermarking a design at 320. In various examples, the watermark may be applied to, for example, the top-level design, one or more sub-level designs, and the digital composition file itself. Watermarking the design may hinder copying the top-level design and/or the sub-level designs in the event that the top-level design and/or the sub-level designs are revealed publically. The watermark may relate to, for example, serialization, a brand, and so forth. The watermark may be overt, covert, and so forth.

Method 300 also includes generating encryption keys at 330. These encryption keys may be used for encrypting the sub-level designs at action 336. In examples involving encryption of sub-level designs themselves, the hashed structure may be generated based on the encrypted versions of the sub-level designs instead of the sub-level designs themselves. In these examples, the encryption keys may also be stored (e.g., with the hashed structure at action 360) to facilitate recovery of the sub-level designs, recreation of hashed structure or an encrypted portion thereof, and so forth.

Method 300 also includes generating a secure time stamp at 350. The secure time stamp may be generated based on the root of the hashed structure. The secure time stamp may be used to authenticate a creation date of the hashed structure and/or the digital composition file. In these examples, storing the hashed structure and a hash of the composition file at 360 may include storing the hashed structure and the hash of the composition file with the secure time stamp in a database in association with the user. Depending on how the hashed structure is stored, it may be desirable to store the secure time stamp with each node of the hashed structure. This may facilitate revealing a subset of elements of the hashed structure without revealing its entirety.

Method 300 also, includes providing a confirmation signal to the user at 370. In some examples, the confirmation signal may be based on the hash of the digital composition file, the root of the hashed structure, and so forth. Transmitting the hash of the digital composition file to the user may allow the user to verify that the digital composition file received at action 310 was not corrupted by comparing the hash of the digital composition file sent at action 370 to a hash of the digital composition file generated by the user. The confirmation signal may also include a timestamp of the hash, a hash from a blockchain in which the hashed structure is stored, and a signature of the notary service to provide a verifiable confirmation to the user.

Method 300 also includes providing an authentication signal to the user at 380. The authentication signal may include information allowing the user to authenticate a date of authorship of one or more of the digital composition file and a revealed sub-level design. This may be achieved by the authentication signal including at least one of the hash of the digital composition file and/or a hash of the revealed sub-level design. The authentication signal may also include timing information that identifies the date at which the hashed structure of the digital composition file was created. The timing information may be based on a time when a blockchain entry associated with the digital composition file was created, based on the secure time stamp, and so forth. In some examples, the hash of the sub-level design along with the hashed structure may allow the user to authenticate a date of authorship of the revealed sub-level design without revealing components of the digital composition file external to the revealed sub-level design. This may be achieved by showing that a path from the sub-level design can be recreated to generate a root of the hashed structure that is timestamped or secured in the block chain.

Figure 4:
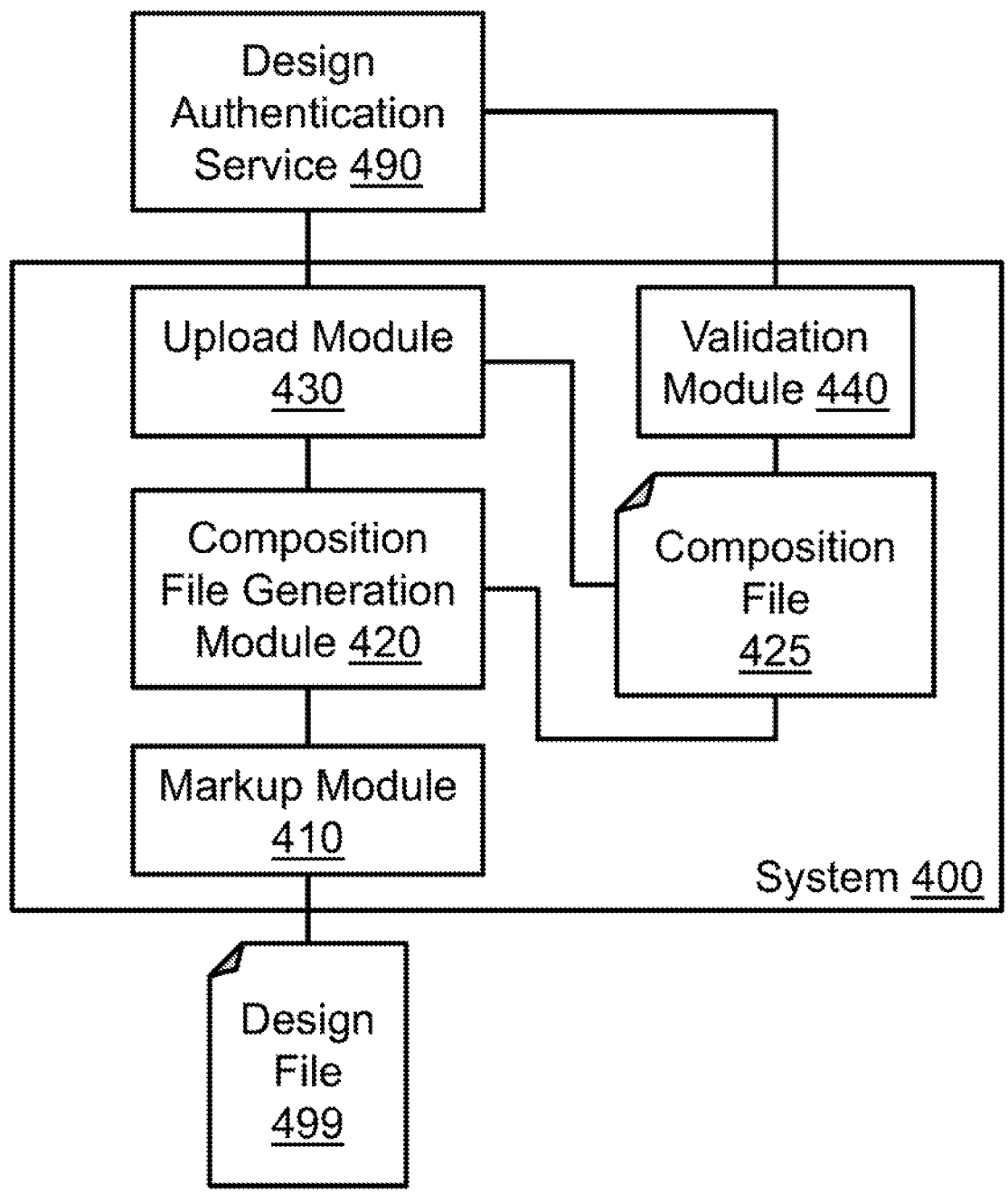
FIG. 4 illustrates an example system associated with digital composition hashing.

FIG. 4 illustrates a system 400. System 400 may be embedded in a device. The device may be, for example, a personal computer (e.g., laptop, desktop), a mobile device (e.g., cell phone, tablet), a server, and so forth. In various examples, different components of system 400 may be controlled or executed by a processor of the device.

System 400 includes a markup module 410. Markup module 410 may allow a user to identify a set of design elements from a design file 499 for protection. Design file

499 may describe an object(s) and/or provide instructions for creating the object(s) (e.g., by a 3D printer). Design file 499 may include artistic elements, functional elements, structural elements, and so forth. The set of design elements identified from design file 499 may be elements for which the user would like to authenticate authorship.

System 400 also includes a composition file generation module 420. Composition file generation module may generate a digital composition file 425. Digital composition file 425 may be generated from the set of design elements and the design file. Digital composition file 425 may include a top-level design and a hierarchy of sub-level designs.

System 400 also includes an upload module 430. Upload module 430 may deliver digital composition 425 file to a design authentication service 490. Design authentication service 490 may store a signature of the digital composition file and a hashed structure generated from the digital composition file in association with the user. This may establish a date of authorship of design file 499 and its sub-level designs in association with the user.

System 400 also includes a validation module 440. Validation module may verify that a signature obtained from a validation signal matches a signature of digital composition file 425. The validation signal may be received from design authentication service 490.

In some examples, system 400 may include an encryption module (not shown). The encryption module may encrypt a sub-level design. When a sub-level design is encrypted, digital composition file 425 may be delivered to design authentication service 490 with encrypted components. These encrypted components may be used to generate the hashed structure and the signature of the digital composition file by design authentication service 490.

Figure 5:
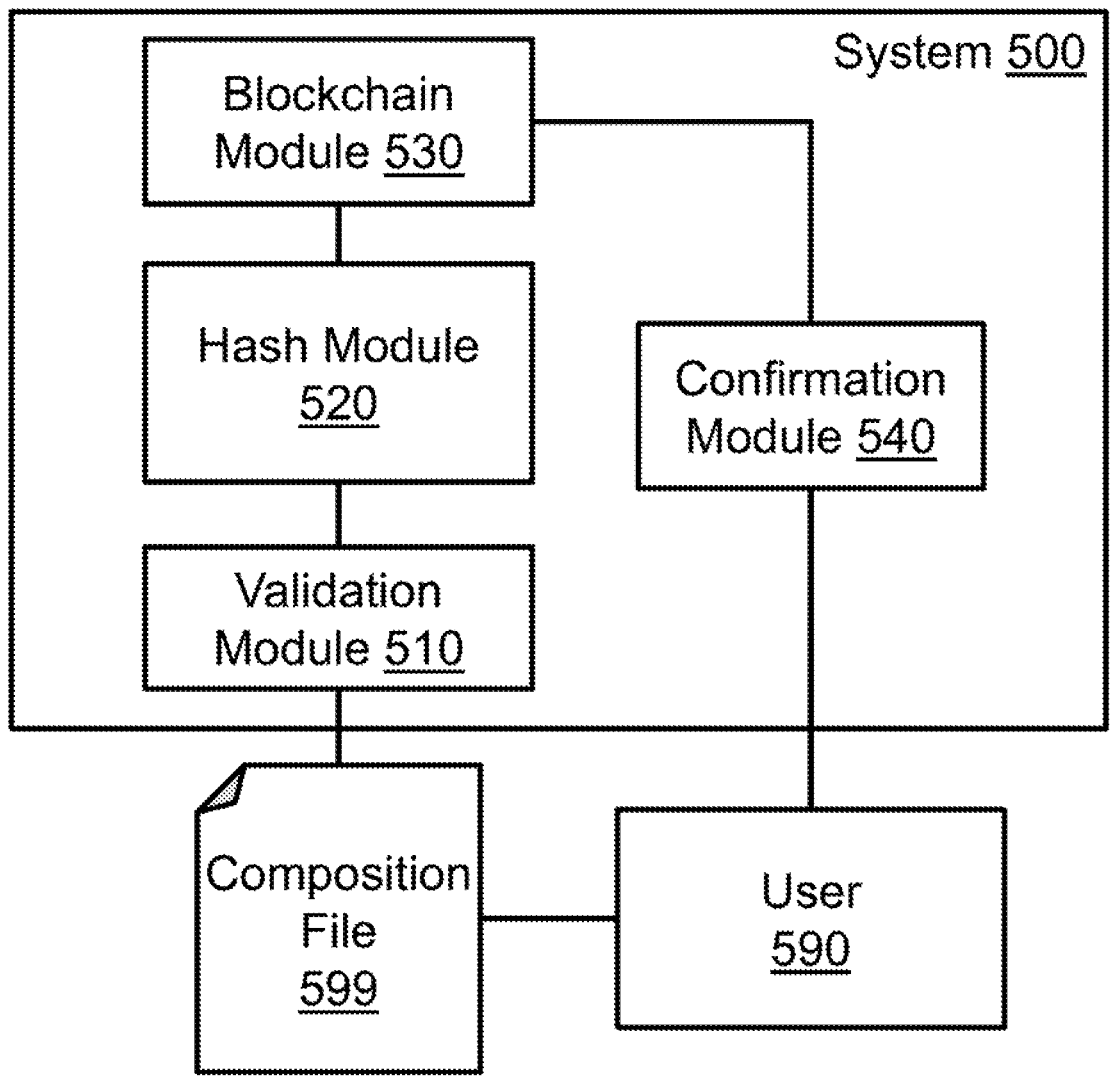
FIG. 5 illustrates another example system associated with digital composition hashing.

FIG. 5 illustrates a system 500 associated with digital composition hashing. System 500 includes a validation module 510. Validation module 510 may receive a digital composition file 599 from a user 590. Validation module 510 may also verify consistency and completeness of digital composition file 599. Digital composition file 599 may include a top-level design and a hierarchy of sub-level designs.

System 500 also includes a hash module 520. Hash module 520 may generate a hashed structure from digital composition file 599. The hashed structure may be generated based on the hierarchy of sub-level designs.

System 500 also includes a blockchain module to store the root of the hashed structure and a hash of digital composition file 599 in association with user 590. The root of the hashed structure and the hash of digital composition file 599 may be stored in a blockchain.

System 500 also includes a confirmation module 540. Confirmation module 540 may provide user 590 the hash of digital composition file 599 and evidence that the hashed structure was stored in the blockchain. The confirmation may include, for example, a timestamp, a hash of the block chain including in which the root of the hashed structure is stored, and so forth.

In some examples, system 500 may also include an encryption module (not shown). The encryption module may generate an encrypted sub-level design from a first sub-level design. In examples where system 500 includes an encryption module, hash module 520 may use the encrypted sub-level design in place of the first sub-level design when generating the hashed structure. When encryption is used, the encryption module may ensure reproducibility of the encrypted sub-level design, and/or decryptability of the sub-level design. In various examples, individual sub-level designs may be encrypted using unique keys, so that the individual sub-level designs can be decrypted without revealing other encrypted portions (unless desired).

Figure 6:
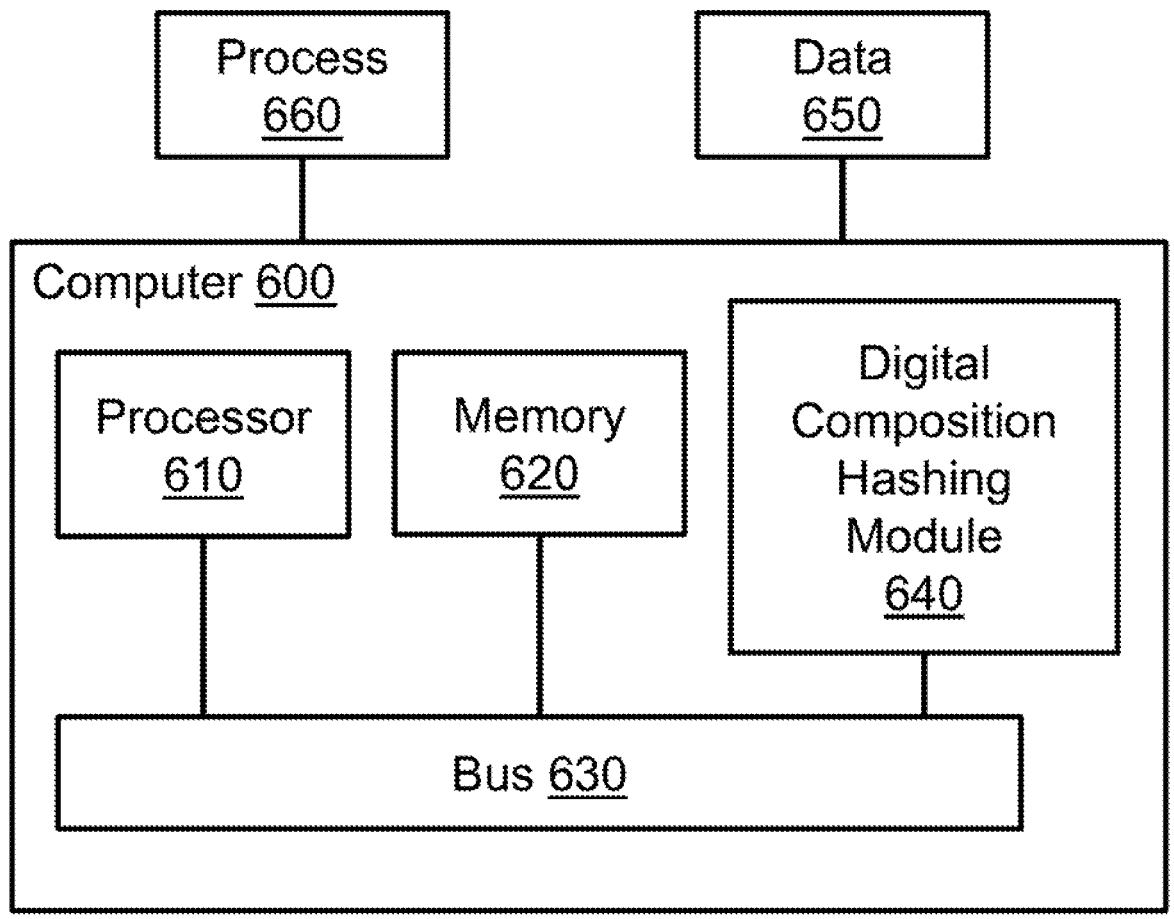
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a digital composition hashing module 640. Digital composition hashing module 640 may perform, alone or in combination, various functions described above with reference to the example systems, methods, and so forth. In different examples, digital composition hashing module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method by a computer system, the method comprising:
   by a processor coupled to a memory to execute a process including,
   receiving a digital composition file from a user, where the digital composition file comprises a design of elements in form of a top-level design and a hierarchy of sub-level designs;
   generating a hashed structure from the digital composition file where a node in the hashed structure for a first sub-level design, among the sub-level designs, is generated based on hashes of second sub-level designs below the first sub-level design in the hierarchy of the sub-level designs; and
   storing the hashed structure and a hash of the digital composition file in association with the user; and
   authenticating an authorship involving the design, in response to an authentication signal to authenticate at least one design element, among the design elements, of the digital composition file,
   wherein the authentication signal includes a hash of a sub-level design revealed among the sub-level designs, and a path from a leaf node in the hashed structure containing the revealed sub-level design to a root of the hashed structure, where the hash of the sub-level design allows the user to authenticate authorship of the revealed sub-level design without revealing other design elements in the digital composition file external to the revealed sub-level design.

2. The method of claim 1, comprising generating a secure time stamp from a root of the hashed structure and where the secure time stamp is stored in a database with the hashed structure and the hash of the digital composition file.

3. The method of claim 2, comprising providing the user the authentication signal, the authentication signal comprising the secure time stamp and at least one hash, among hashes, of:
a hash of the digital composition file, or
the hash of the revealed sub-level design and the path from the leaf node in the hashed structure containing the revealed sub-level design to the root of the hashed structure, where the hash of the sub-level design allows the user to authenticate a date of authorship of the revealed sub-level design based on the secure timestamp without revealing other design elements of the digital composition file external to the revealed sub-level design.

4. The method of claim 1, where the hashed structure and the hash of the digital composition file are stored using a blockchain.

5. The method of claim 1, where at least one sub-level design, among the sub-level designs, of the digital composition file is received in an encrypted state and where the method comprises decrypting the at least one sub-level design to facilitate generating the hashed structure.

6. The method of claim 1, comprising encrypting the sub-level designs, and where the hashed structure is generated based at least in part on the encrypted versions of the sub-level designs.

7. The method of claim 6, comprising generating encryption keys for encrypting the sub-level designs, and storing the encryption keys to facilitate recovery of the sub-level designs.

8. The method of claim 1, where the sub-level designs are described by metadata, respectively, and where the metadata is incorporated into the hashed structure.

9. The method of claim 8, where the metadata includes private metadata and public metadata, and where the private data is incorporated into the hashed structure in an encrypted state.

10. The method of claim 1, comprising watermarking at least one design element, among the design elements, of a top-level design, a sub-level design, and the digital composition file.

11. The method of claim 1, comprising providing a confirmation signal indicating the authenticated authorship of the design to the user, where the confirmation signal is based on the hash of the digital composition file.

12. A system, comprising:
a memory to store instructions; and
a processor coupled to the memory to execute the instructions to,
allow a user to identify a set of design elements from a design file for protection;
generate, from the set of design elements and the design file, a digital composition file comprising a top-level design and a hierarchy of sub-level designs;
deliver the digital composition file to a design authentication service; and
perform a verification that a signature obtained from a validation signal received from the design authentication service matches a signature of the digital composition file,
where,
the design authentication service stores the signature of the digital composition file and a hashed structure generated from the digital composition file in association with the user, and
the validation signal includes a hash of a sub-level design revealed among the sub-level designs, and a path from a leaf node in the hashed structure containing the revealed sub-level design to a root of the hashed structure, where the hash of the sub-level design allows the user to perform the verification of the revealed sub-level design without revealing other design elements in the digital composition file external to the revealed sub-level design.

13. The system of claim 12, the processor is further to encrypt a sub-level design among the sub-level designs.

14. A system, comprising:
a memory to store instructions; and
a processor to couple to the memory to execute the instructions to,
receive a digital composition file from a user, and to verify consistency and completeness of the digital composition file, where the digital composition file comprises a top-level design, and a hierarchy of sub-level designs;
perform a hashing to generate a hashed structure from the digital composition file based on the hierarchy of sub-level designs;
store in a blockchain, a root of the hashed structure and a hash of the digital composition file in association with the user; and
provide the user the hash of the digital composition file and evidence the hashed structure was stored in the blockchain,
wherein
provide an authentication signal including a hash of a sub-level design revealed among the sub-level designs, and a path from a leaf node in the hashed structure containing the revealed sub-level design to a root of the hashed structure, where the hash of the sub-level design allows a user to authenticate authorship of the revealed sub-level design without revealing other design elements in the digital composition file external to the revealed sub-level design.

15. The system of claim 14, wherein the processor is to perform an encryption to generate an encrypted sub-level design from a sub-level design, among the sub-level designs, where the hashing uses the encrypted sub-level design in place of the sub-level design when generating the hashed structure, where the encryption ensures at least one of reproducibility of the encrypted sub-level design, and decryptability of the sub-level design.

* * * * *